United States Patent [19]
Choi et al.

[11] Patent Number: 5,948,077
[45] Date of Patent: Sep. 7, 1999

[54] DEVICE IDENTIFICATION WITH ANALOG SIGNAL LEVEL

[75] Inventors: Bong-Rak Choi, Seoul; Joong-Sun You, Suwon, both of Rep. of Korea

[73] Assignee: SamSung Electronics Co., Ltd., Suwon, Rep. of Korea

[21] Appl. No.: 08/960,506

[22] Filed: Oct. 29, 1997

[30] Foreign Application Priority Data

Oct. 29, 1996 [KR]  Rep. of Korea ................ 96-49735

[51] Int. Cl.$^6$ ............................................. G06F 13/00
[52] U.S. Cl. .................... 710/9; 340/825.52; 361/686; 710/8
[58] Field of Search ................................. 395/829, 828, 395/821; 340/825.52, 500; 361/686, 683; 439/329

[56] References Cited

U.S. PATENT DOCUMENTS

| | | | |
|---|---|---|---|
| 4,138,599 | 2/1979 | Munter | 371/67.1 |
| 4,524,349 | 6/1985 | Hyatt | 340/500 |
| 4,660,141 | 4/1987 | Ceccon et al. | 395/829 |
| 4,889,977 | 12/1989 | Haydon | 235/375 |
| 5,442,512 | 8/1995 | Bradbury | 361/683 |
| 5,505,633 | 4/1996 | Broadbent | 439/329 |
| 5,592,361 | 1/1997 | Smith et al. | 361/679 |
| 5,642,259 | 6/1997 | Ma | 361/686 |
| 5,783,926 | 7/1998 | Moon et al. | 320/106 |

*Primary Examiner*—Gopal C. Ray
*Attorney, Agent, or Firm*—Robert E. Bushnell, Esq.

[57] ABSTRACT

An identification system for identifying plug-in or modular type peripheral devices adopted in a portable computer through one module bay is described. The identification system includes a voltage divider provided at the peripheral device. This voltage divider is connected to a signal line for supplying specific voltage level with the portable computer through a connector. Also, this signal line is coupled with a resistor which generates a reference voltage. An analog-to-digital converter is provided for converting voltage level produced at the signal line into the corresponding digital value. This digital value is supplied with the computer system to determine whether the digital value corresponds to a preset value designated to a specific peripheral device. To this end, a ROM BIOS stores a plurality of identification data corresponding to each digital value of the A/D converter. By detecting different analog voltage level as an identification signal through a signal line, using only one signal line is possible. This provides the most effective method for identifying more than three peripheral devices with the least signal lines and connector pins. Thus, the size of the connector can be reduced, and thereby saving space of the portable computer.

12 Claims, 4 Drawing Sheets

DEVICE IDENTIFICATION WITH ANALOG SIGNAL LEVEL

CLAIM OF PRIORITY

This application makes reference to, incorporates the same herein, and claims all benefits accruing under 35 U.S.C. §119 from an application for Device Identification With Analog Signal Level earlier filed in the Korean Industrial Property Office on Oct. 29, 1996 and there duly assigned Serial No. 49735/1996.

FIELD OF THE INVENTION

The present invention relates to portable computers, and more particularly to an identification of peripheral devices mounted to a module bay of the portable computer.

DESCRIPTION OF THE RELATED ART

Portable or notebook computers have become a popular alternative to traditional desktop computers in terms of movability, simplicity, and various functions. However, one problem is difficulty in providing versatility due to smaller size. Smaller size naturally means less space to provide a broad choice in peripheral devices and options. Advantageously, plug-in type function modules or drive packs have been provided for such as floppy disk drives, CD-ROM drives, and hard disk drives that are changeable with one another at a drive bay when necessary. Also, provided is a docking station for incorporating the portable computer with some kind of peripherals and expansion devices such as CD-ROM drives, external speakers, and extra batteries. This enhances expandability of the portable computer.

One problem faced with portable computers is how to determine which peripheral is currently being connected to the portable computer. U.S. Pat. No 5,642,259 for an Arrangement for Connecting an Expansion Card to a Connector Socket in a Personal Computer, U.S. Pat. No. 5,505,633 for an Integral External Connector Interface for Thin Form Factor Computer Cards to Broadbent, and U.S. Pat. No. 5,442,512 for a Modular Portable Computer Work Station Selectively Powered by Either an Internal Battery Charger, or an External DC Input to Bradbury each disclose peripheral identification through a plurality of signal lines. U.S. Pat. No. 5,592,361 for an Electronic Device With Identification Card Receptacle to Smith et al discloses identification of a business card inserted into a portable computer. What is needed is a portable computer that identifies which peripheral device is connected to a portable computer by using only a single signal line.

SUMMARY OF THE INVENTION

It is therefore an object of the invention to provide a new identification system for the modular or plug-in type peripheral devices adopted in a portable computer, in which the signal line for identifying available peripheral devices is reduced.

It is yet another object of the invention to use voltage division combined with an analog to digital converter combined with a memory that stores the different voltages for each peripheral in order to identify which peripheral is connected to the portable computer.

It is also an object of the present invention to have a plurality of peripheral devices that can be connected to a single port of a portable computer, where each peripheral device contains a voltage dividing resistor of a different and unique value in order to identify the peripheral once plugged in.

According to one aspect of this invention, the device identification system comprises a voltage divider means provided at the peripheral device for supplying specific voltage level with the portable computer through a connector; a signal line connected with the voltage divider means through the connector and coupled with a reference voltage generator means; an analog-to-digital converter for converting voltage level produced at the signal line into the corresponding digital value to supply the digital value with the system bus; and a ROM BIOS storing a plurality of identification data corresponding to the digital value supplied from the analog-to-digital converter.

Preferably, the voltage divider means includes a resistor having a preset resistance value, and the resistance value in each of the peripheral device is different to each other. Further, the reference voltage generator means includes a resistor and a preset voltage supply.

According to another aspect of this invention, there is provided a method for identifying plug-in type modules of peripheral devices incorporating with a portable computer through one module bay, the device identification method comprises the steps of detecting voltage level of a signal line in a connector connected with a voltage divider means provided in a peripheral device; converting the voltage level detected from the signal line into the corresponding digital value; sending the digital value to ROM BIOS 120 in order to check if the digital value is identical with the reference value; determining whether the digital value corresponds to a preset value designated to a specific peripheral device if the input digital value is not identical with the reference value; and performing initialization routine related to the specific peripheral device to activate the device.

In the preferred form of this invention, the signal line is coupled with a reference voltage generator means consists of a resistor and a preset voltage supply. Also, the reference value is stored in the ROM BIOS and corresponds to the analog voltage across the reference voltage generator means.

Advantageously, by supplying different analog voltage level as an identification signal designated to a specific peripheral device through a connector, using only one signal line is possible. This provides the most effective method for identifying more than three peripheral devices with the least signal lines and connector pins. With this, the size of the connector is reduced, and thereby saving space of the portable computer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
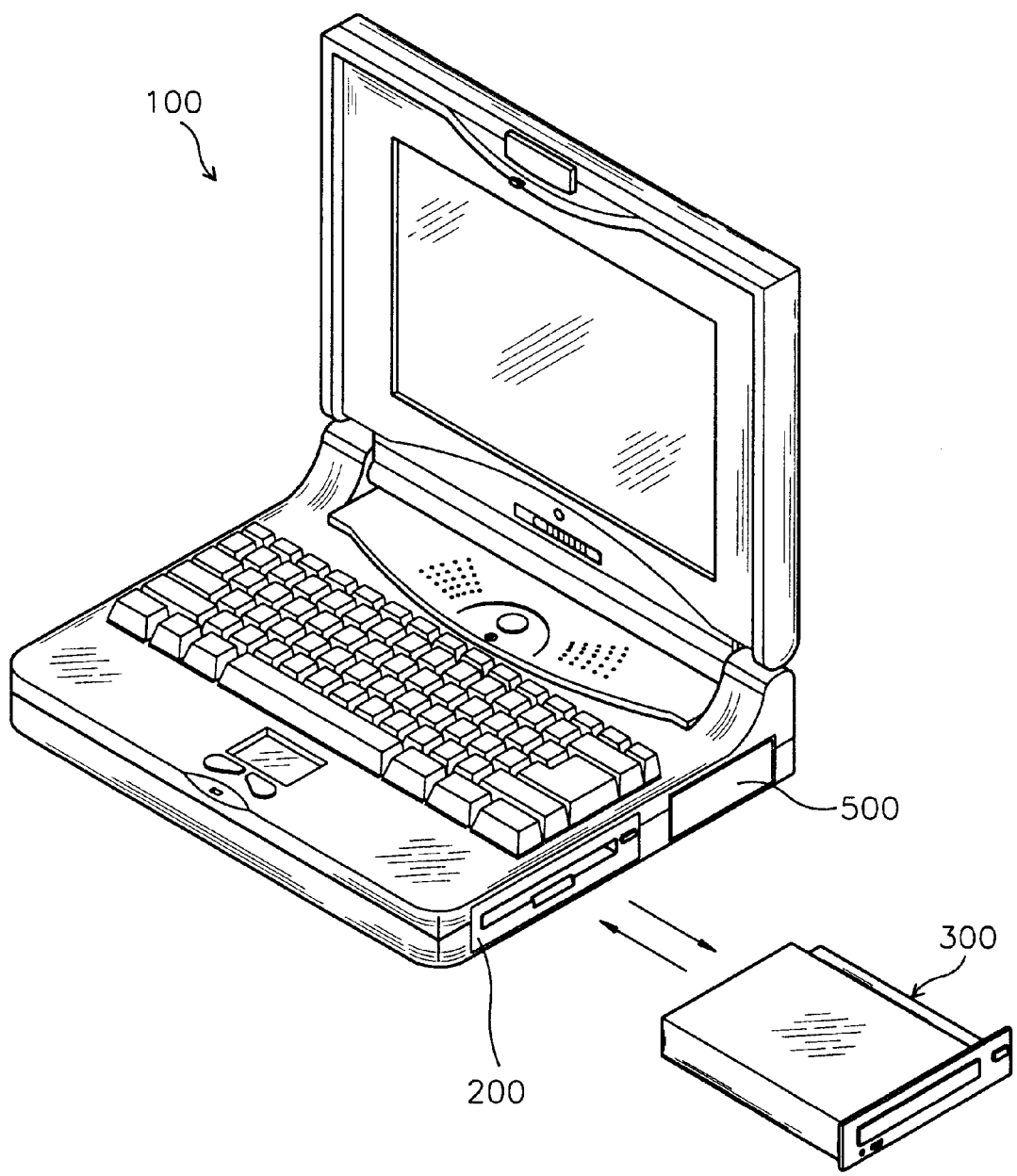
FIG. 1 is an illustration showing a conventional portable computer incorporating exchangeable drive packs.
Figure 2:
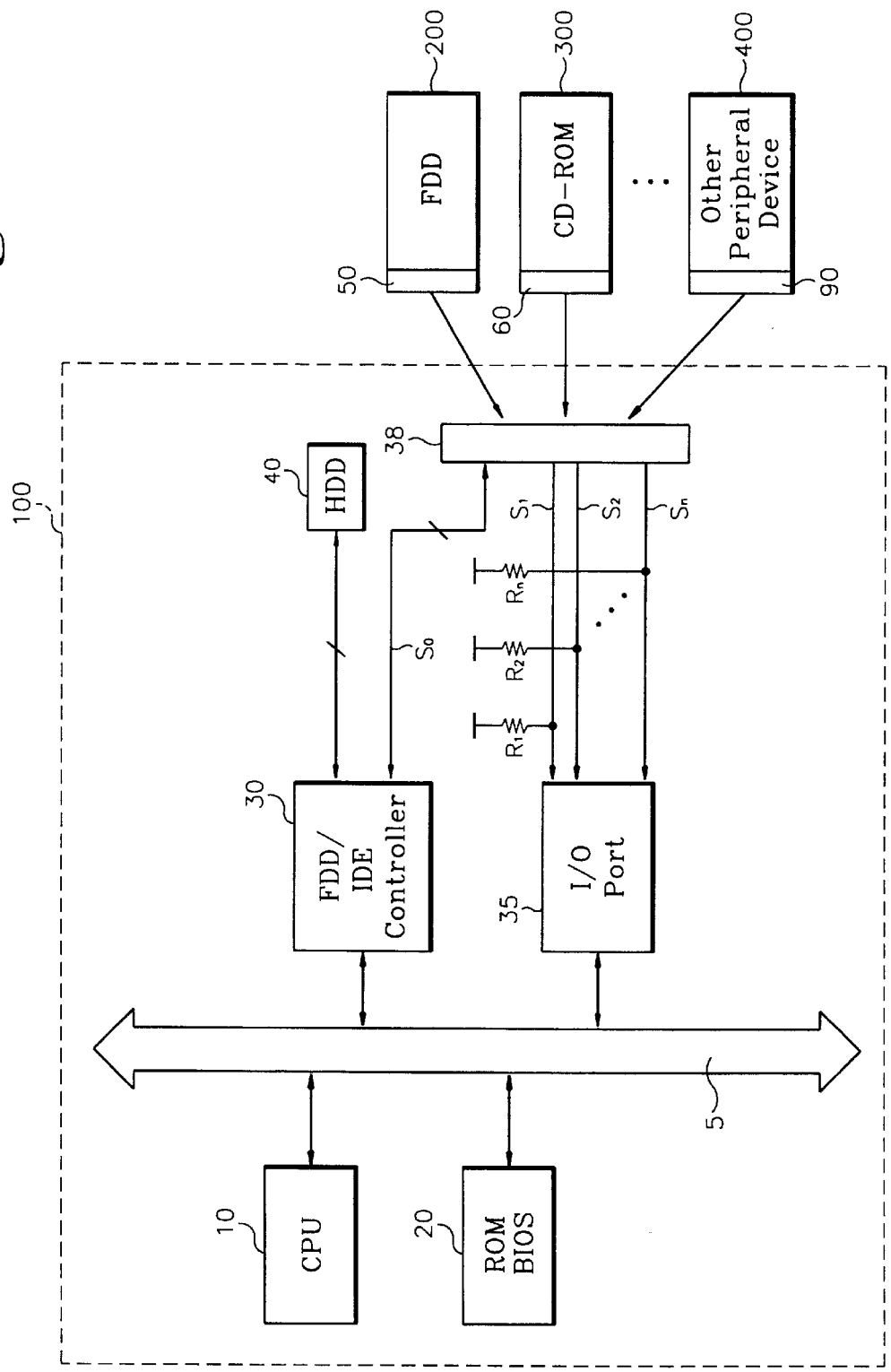
FIG. 2 is a block diagram of an apparatus for identifying peripheral devices mounted to a module bay of the portable computer.

FIG. 1 shows a conventional portable computer, incorporating the plug-in type modules of peripheral devices. A floppy disk drive pack 200, for example, is inserted in a module bay of the portable computer 100 and another peripheral device such as a CD-ROM drive pack 300 is prepared for changing with the floppy disk drive pack 200. Reference number 500 denotes PCMCIA cards slot. The drive pack 200 or 300 has at a rear side thereof a connector (not shown) to be coupled with a connector provided inside the module bay. When desired drive pack is inserted, the portable computer 100 recognizes the kind of the peripheral device in order properly to set the corresponding device driver. Identification system of the peripheral device or drive pack is schematically shown in FIG. 2. There, the portable computer 100 has a connector 38 provided for connection with one of connectors 50, 60, and 90 of the FDD 200, CD-ROM drive 300 and other peripheral device 400, respectively.

The connector 38 has signal lines $S_0$ which are led to an FDD/IDE controller 30 to communicate control and data signals with the plug-in peripheral device. Further, the connector 38 has signal lines $S_1$–$S_n$ led to an I/O port 35 to transfer device identification signals. If number of optional peripheral devices to be connected with the connector 38 is determined to N, the number of the signal lines $S_1$–$S_n$ is determined such that it is not less than the value of $\log_2 N$. For example, if five devices are prepared to be used, three signal lines ($\log_2 5=2.32$) are required to identify each device. Each signal line is applied by a preset voltage across resistors $R_1$–$R_n$ and selectively grounded in the peripheral device via the connector 38. Thus, the device identification signal can be consisted of a combination of digital "1" or "0" given in the signal lines $S_1$–$S_n$. Each peripheral device has specific combinational digital signal level in the signal lines $S_1$–$S_n$.

In this identification system, the combinational digital signal is supplied with the I/O port 35 when the computer system is started. Then, a CPU 10 detects the identification signal via system bus 5 and allows a BIOS 20 to perform corresponding device initialization routine. Also, the computer system 100 has internal hard disk drive 40 connected with the FDD/IDE controller 30, in which an operating system is stored.

However, this identification system has drawbacks of multiple signal lines provided between the I/O port 35 and a peripheral device. This requires provision of the corresponding number of pins in the connector 38, thereby increasing dimensions of the connector 38. Further, if the dimension of the connector 38 and the number of the connector pins are limited, the number of optional peripheral devices should be confined and signal lines available to the other signals is reduced.

Figure 3:
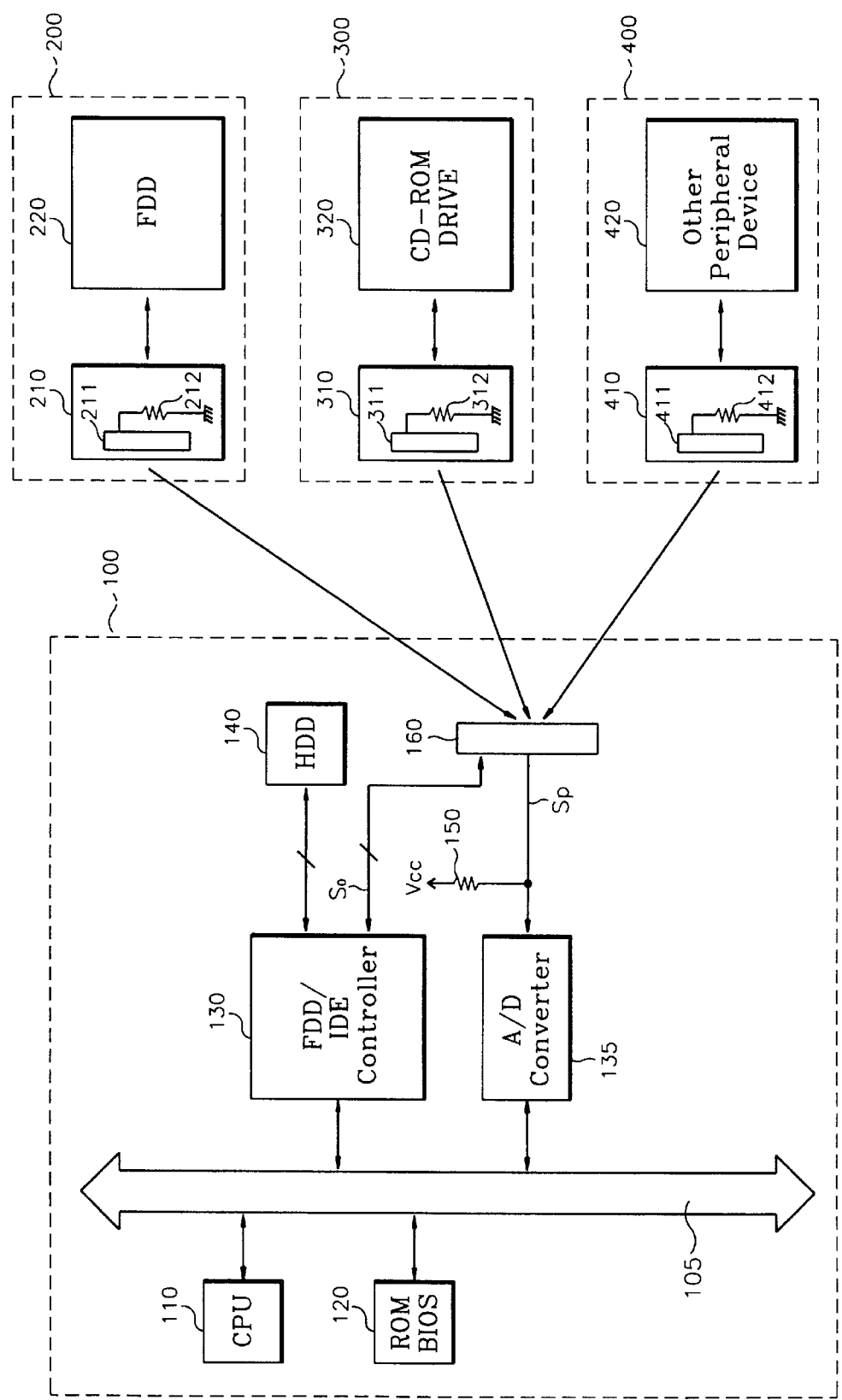
FIG. 3 is a block diagram of an apparatus for identifying peripheral devices in accordance with the present invention.

Referring to FIG. 3, there is shown an identification system of plug-in type peripheral devices adopted in a portable computer in accordance with the present invention. The portable computer has the same configuration as that shown in FIG. 1, incorporating various kind of plug-in type peripheral devices in such a manner that one of the desired peripheral devices is inserted in a module bay of the portable computer. Preferably, the plug-in type peripheral device includes a floppy disk drive 200, a CD-ROM drive 300, and other peripheral device 400 such as DVD drive, and each device has same dimensions. Also, the device has a connector to be coupled with a connector provided in a module bay of the portable computer. In FIG. 3, reference number 160 denotes the connector provided in the module bay of the portable computer 100, and numerals 211, 311, and 411 denote the connectors provided in the peripheral devices 200, 300 and 400. These connectors 211, 311, and 411 are incorporated with interface boards 210, 310, and 410 of the peripheral devices 200, 300 and 400, respectively.

The connector 160 has signal lines $S_0$ which are led to an FDD/IDE controller 130 to communicate control and data signals with the plug-in peripheral device. Further, the connector 160 includes a signal line $S_p$ led to an analog-to-digital (A/D) converter 135 to transfer the device identification signal to the computer system via a bus 105. The signal line $S_p$ is applied by a preset voltage Vcc via a resistor 150. Also, the signal line $S_p$ is connected through the corresponding connector pins of the connector 160 and one of connectors 211, 311, and 411 with voltage dividers 212, 312, and 412 provided in each of the interface boards 210, 310, and 410. Voltage dividers 212, 312, and 412 have different resistance values and are connected with the ground. Alternatively, the voltage dividers 212, 312, and 412 may be connected with preset voltage supply, and the signal line $S_p$ with the ground. Thus, the voltage of the signal line $S_p$ is determined by the resistor 150 and one of the voltage dividers 212, 312, and 412.

In this arrangement, the resistor 150 placed on the signal line $S_p$ forms a reference voltage source supplied with input of the A/D converter 135, and preferably has resistance value of 10 kΩ. Also, the voltage dividers 212, 312, and 412 are preferably set to 30 kΩ, 20 kΩ, and 10 kΩ, respectively. For example, when the CD-ROM drive pack 300 is used, the voltage level appeared at the signal line $S_p$ will be about 3.3 Volts, I. e., $\{20\ \text{k}\Omega/(20\ \text{k}\Omega+10\ \text{k}\Omega)\} * 5$ Volts.

Such a voltage of the signal line $S_p$ is supplied with the A/D converter 135 as the device identification signal when the computer system is started. The A/D converter 135 converts the analog input voltage into corresponding digital output value so that CPU 110 may detect the device identification signal via system bus 105 and allows the ROM BIOS 120 to determine the kind of the plug-in device and to perform corresponding device initialization routine during booting process. Also, the portable computer system 100 has internal hard disk drive 140, connected with the FDD/IDE controller 130, in which an operating system is stored.

Figure 4:
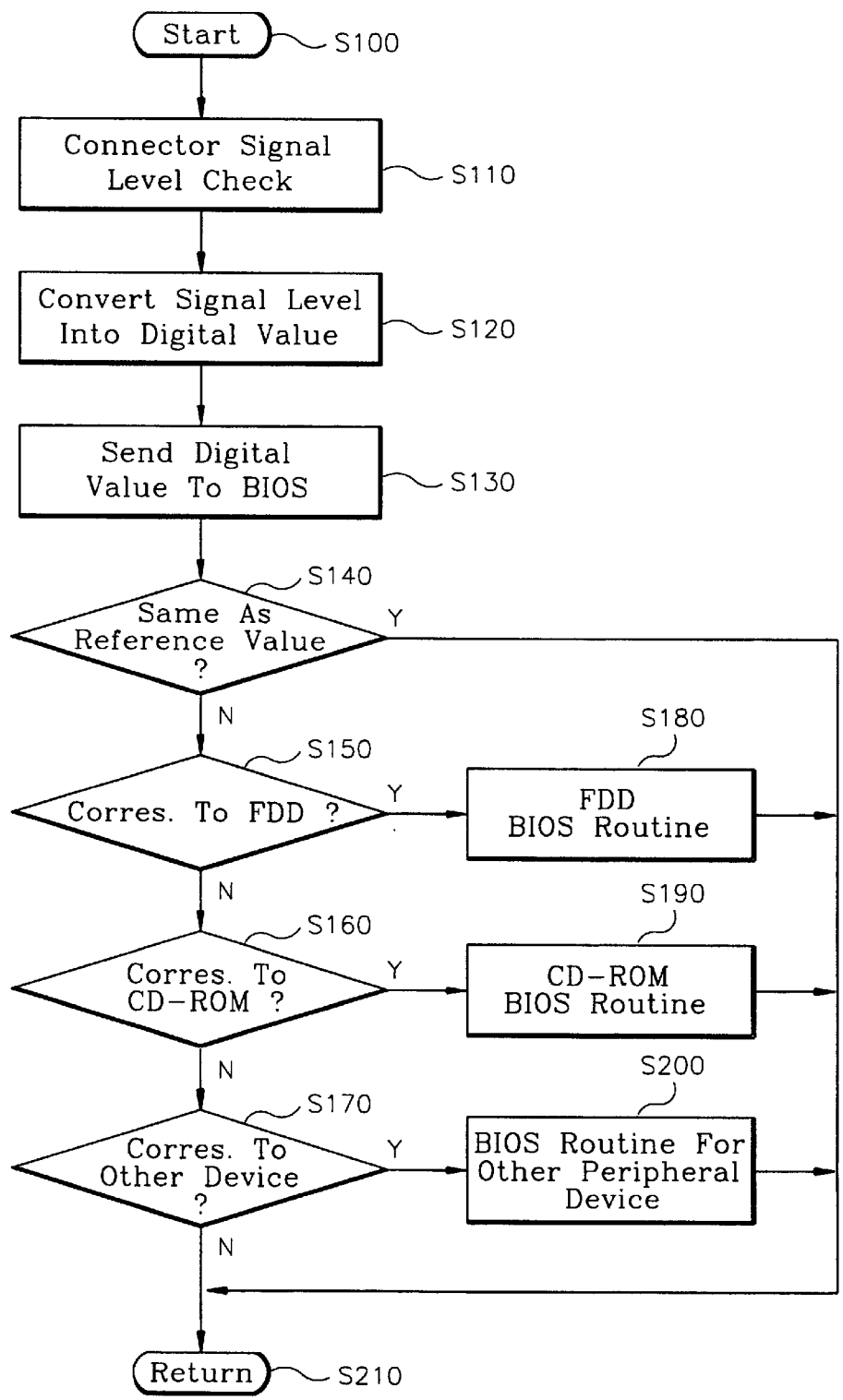
FIG. 4 is a flow diagram depicting the device identification process performed in the portable computer.

The device identification process performed in the portable computer will be described in detail with reference to FIG. 4. When the portable computer 100 is started and booting is in progress, voltage of the signal line $S_p$ of the connector 160 is detected at step 1 10, and the signal level is converted by the A/D converter 135 into corresponding digital value at step 120. The digital value of the device identification signal is supplied with ROM BIOS 120 at step 130, in order to check if the input digital value is identical with the reference value. This reference value is stored in the ROM BIOS 120 and corresponds to the analog voltage across the resistor 150 located at the signal line $S_p$.

If the input digital value is identical with the reference value, it is recognized that none of the peripheral devices are incorporated with the portable computer via the connector 160 and returns to the booting process at step 210. Otherwise, it proceeds to step 150 to determine whether the input digital value corresponds to a preset value designated to the FDD 200. If it corresponds to a preset value of the FDD, that is the FDD is identified, the ROM BIOS performs initialization routine related to the FDD at step 180 and the FDD 200 is activated.

If it is found that the input digital value does not correspond to the preset value of the FDD at step 150, it proceeds to next step 160 to check if it corresponds to a preset value designated to the CD-ROM drive 300. If it is found yes, the ROM BIOS performs initialization routine related to the CD-ROM drive at step 190, thus the CD-ROM drive 300 is activated.

Further, if it is found that the input digital value does not correspond to the preset value of the CD-ROM, it proceeds to next step 170 to check if it corresponds to a preset value designated to the other peripheral device. If it is found yes, the ROM BIOS performs initialization routine related to the corresponding device at step 200.

Like this, the ROM BIOS continues identification of the plug-in peripheral device until the input digital value corresponds to the preset value designated to a specific peripheral device. Once the identification process has finished, initialization routine for the specific device is performed to activate the device.

As apparent from foregoing, the identification system of the present invention provides a minimization of signal lines used for identifying plug-in type peripheral devices. Advantageously, by supplying different analog voltage level as an identification signal designated to a specific peripheral device through a connector, using only one signal line is possible. This will provides the most effective method for identifying more than three peripheral devices with the least signal lines and connector pins. Thus, the size of the connector can be reduced, and thereby saving space of the portable computer.

While the invention has been described in terms of an exemplary embodiment, it is contemplated that it may be practiced as outlined above with modifications within the spirit and scope of the appended claims.

What is claimed is:

1. In a portable computer incorporating plug-in modules of peripheral devices through one module bay, a device identification system comprising:
    a voltage divider means provided at the peripheral device for supplying specific voltage level with the portable computer through a connector;
    a signal line connected with the voltage divider means through the connector and coupled with a reference voltage generator means;
    an analog-to-digital converter for converting voltage level produced at the signal line into the corresponding digital value to supply the digital value with a system bus; and
    an input/output means for a memory for storing a plurality of identification data corresponding to the digital value supplied from the analog-to-digital converter.

2. The device identification system of claim 1, wherein the voltage divider means includes a first resistor having a preset resistance value and a second resistor in each of the peripheral devices, said second resistor varying depending on the peripheral device.

3. The device identification system of claim 1, wherein the reference voltage generator means includes a resistor and a preset voltage supply.

4. The device identification system of claim 3, wherein the preset voltage supply includes operating voltage level.

5. The device identification system of claim 3, wherein the preset voltage supply includes ground level.

6. A method for identifying plug-in modules of peripheral devices incorporating with a portable computer through one module bay, the device identification method comprising the steps of:
    detecting voltage level of a signal line in a connector connected with a voltage divider means provided in a peripheral device;
    converting the voltage level detected from the signal line into the corresponding digital value;
    sending the digital value to an input/output means for a memory in order to check if the digital value is identical with the reference value;
    determining whether the digital value corresponds to a preset value designated to a specific peripheral device if the input digital value is not identical with the reference value; and
    performing initialization routine related to the specific peripheral device to activate the device.

7. The method for identifying peripheral devices as claimed in claim 6, wherein the signal line is coupled with a reference voltage generator means.

8. The method for identifying peripheral devices as claimed in claim 6, wherein the reference voltage generator means include a resistor and a preset voltage supply.

9. The method for identifying peripheral devices as claimed in claim 8, wherein the reference value is stored in said memory and corresponds to the analog voltage across the reference voltage generator means.

10. A device for identifying peripheral devices of a portable computer, comprising:
    a portable computer comprising:
        a reference voltage source,
        a first resistor having a first end and a second end, said first end being connected to said reference voltage source,
        a connector for providing attachment to a peripheral device, and
        a signal line for electrically connecting said second end of said first resistor to said connector; and
    a peripheral device comprising:
        a connector that matingly engages to said connector of said portable computer, and
        a second resistor having a first end and a second end, said first end connected to said connector of said peripheral device and said second end connected to ground.

11. The device of claim 10, wherein said second end of said first resistor is connected to an input of an analog to digital converter.

12. The device of claim 11, wherein an output of said analog to digital converter is connected to read only memory via a system bus, to enable comparison of said output of said analog to digital converter to peripheral device versus voltage data listed in said read only memory.

* * * * *